United States Patent [19]

Chevillat et al.

[11] Patent Number: 4,674,103

[45] Date of Patent: Jun. 16, 1987

[54] METHOD AND ARRANGEMENT FOR DETECTING THE PRESENCE OF A TRAINING SIGNAL IN A MODEM RECEIVER

[75] Inventors: Pierre R. Chevillat, Kilchberg; Dietrich G. Maiwald, Wadenswil; Gottfried Ungerboeck, Langau a.Albis, all of Switzerland

[73] Assignee: International Business Machines Corp., Armonk, N.Y.

[21] Appl. No.: 888,295

[22] Filed: Jul. 22, 1986

[30] Foreign Application Priority Data

Aug. 28, 1985 [EP] European Pat. Off. ............ 85110807

[51] Int. Cl.$^4$ .................... H03H 7/30; H03K 5/159
[52] U.S. Cl. ........................................ 375/13; 364/724
[58] Field of Search ............................. 375/11, 13, 96; 364/517, 724, 825; 370/110.3; 379/361, 386; 340/825.71

[56] References Cited

U.S. PATENT DOCUMENTS

| | | | |
|---|---|---|---|
| 3,961,167 | 6/1976 | Mills | 364/724 |
| 4,606,045 | 8/1986 | Miller | 375/13 |
| 4,618,941 | 10/1986 | Linder et al. | 364/724 |

*Primary Examiner*—Benedict V. Safourek
*Attorney, Agent, or Firm*—John B. Frisone

[57] ABSTRACT

For rapidly detecting a periodic training signal in a modem receiver, delay line storage (21) is provided for a signal section which is equal to one training signal period (q·M samples) plus an additional adjacent window (q·W samples). Thus, the stored signal section includes two windows (17', 19) which are offset by one training signal period and which are similar if a training signal is present. In evaluation means (41) connected to the two windows (17', 19), two auxiliary signals ($z_1$, $z_2$) are generated (61, 65) which represent the signal energy and the correlation, respectively, of the samples in the two windows. From the auxiliary signals, a dissimilarity metric ($z_3$) is derived (69) and is compared (73) to a given threshold for generating an indicator signal (CYC) which becomes active when a training signal is present, i.e. when the two window contents are similar and the metric ($z_3$) falls below the threshold. A carrier frequency offset estimate ($\hat{\Delta}_f$) is also derived from the second auxiliary signal ($z_2$).

13 Claims, 6 Drawing Figures

TYPICAL BEHAVIOR OF $Z_3$ AND CYC IN RESPONSE TO AN INCOMING TRAINING SIGNAL

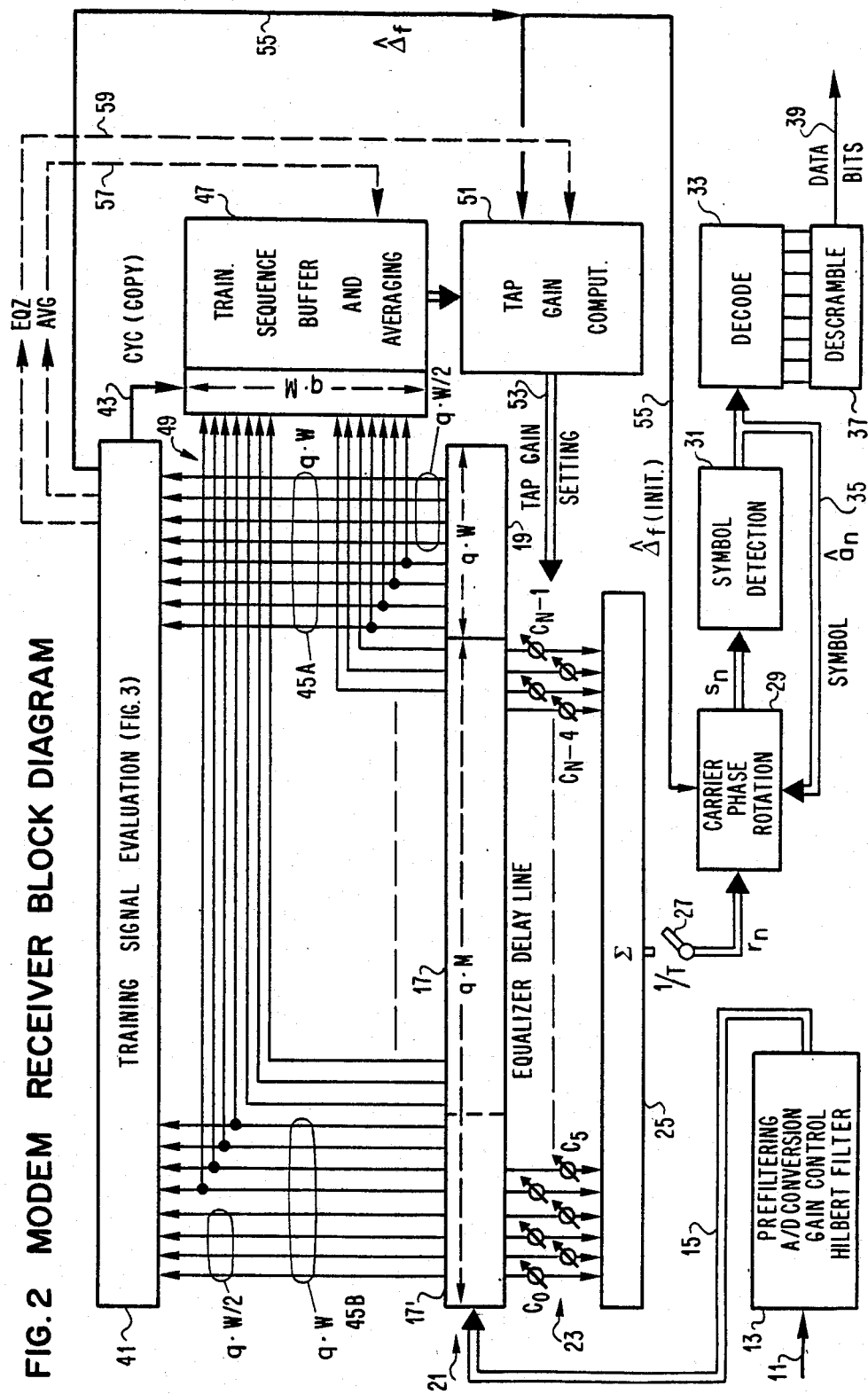
FIG. 2 MODEM RECEIVER BLOCK DIAGRAM

EMBODIMENT OF TRAINING SIGNAL DETECTION AND CARRIER FREQUENCY OFFSET ESTIMATION

A = DETERMINATION OF AVERAGE SIGNAL ENERGY IN WINDOW

B = CORRELATION OF SAMPLE SETS IN WINDOWS

C = GENERATION OF DISSIMILARITY METRIC

D = THRESHOLD COMPARISON

E = DETERMINATION OF CARRIER FREQUENCY OFFSET

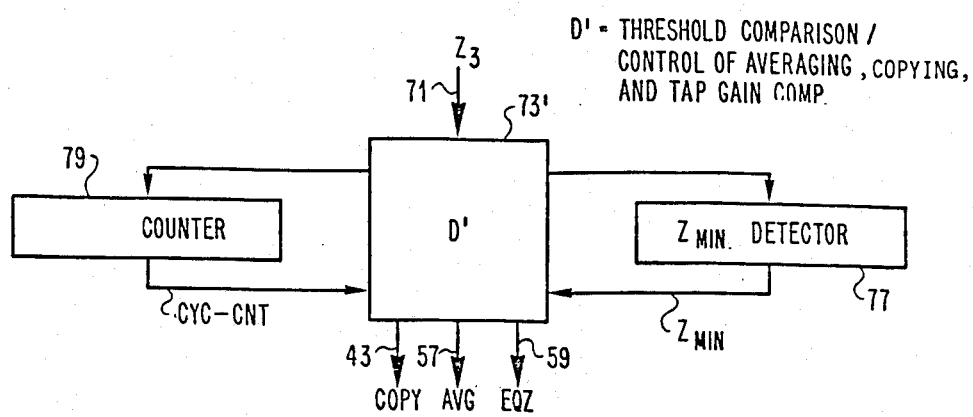
FIG. 5 ALTERNATIVE EVALUATION AND CONTROL MEANS
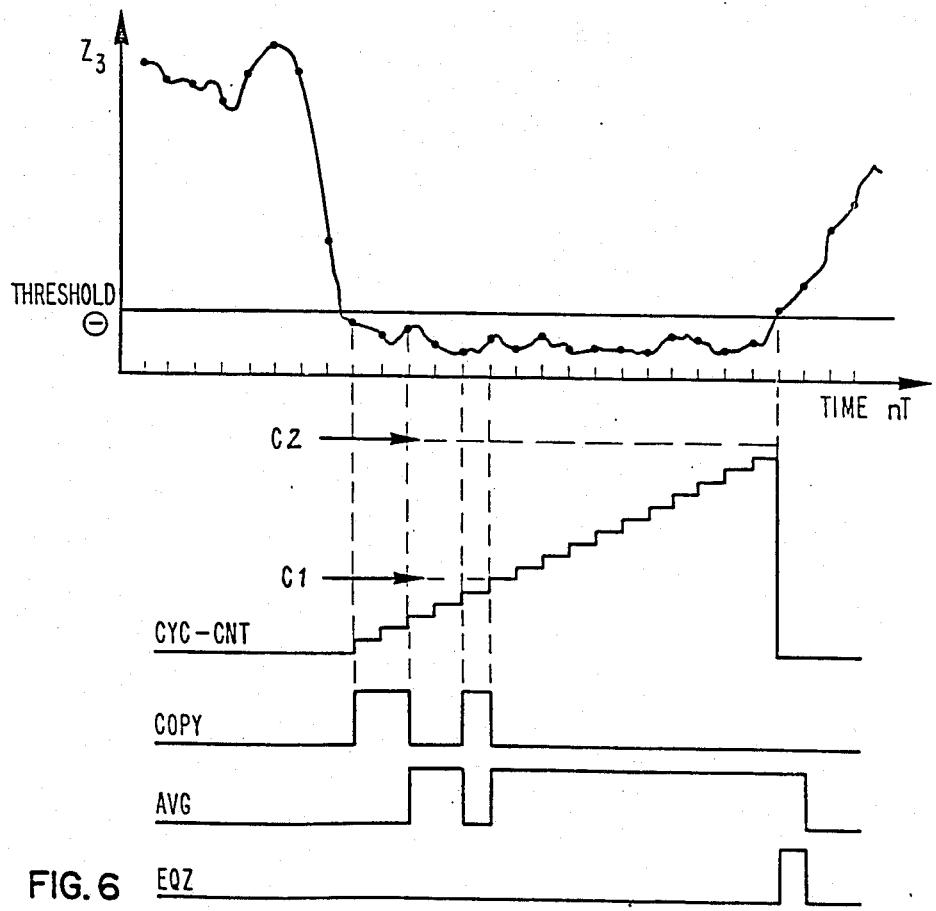
FIG. 6 SIGNALS OF ALTERNATIVE EVALUATION AND CONTROL MEANS IN RESPONSE TO AN INCOMING TRAINING SIGNAL

METHOD AND ARRANGEMENT FOR DETECTING THE PRESENCE OF A TRAINING SIGNAL IN A MODEM RECEIVER

FIELD OF INVENTION

Present invention relates to modem technology for data transmission, and in particular to a method and an arrangement for detecting, in a modem receiver, the presence of a periodic training signal which is sent prior to actual data transmission for conditioning the receiver.

BACKGROUND

Transmitting digital data over a telephone network or line requires the use of modems. In the sending modem, a carrier signal is modulated by the data. In the receiving modem, the signal is demodulated to restore the original data.

Because the transmission channel introduces distortion, the modem receiver employs an equalizer for compensating the resulting inter-symbol interference. For every transmission, the input amplifier and the equalizer must be set to reflect the current transmission characteristics of the channel. Furthermore, carrier synchronization and symbol timing recovery have to be performed.

For setting the parameters in the modem receiver, prior to actual data transmission, a so-called training sequence is sent whose elements are known to both, transmitter and receiver. The channel characteristics can then be derived from the received training signal, allowing the receiver to carry out initial gain setting, equalizer training, symbol synchronization, and acquisition of carrier phase and frequency.

Use of training sequences was described e.g. in an article by K. H. Mueller and D. A. Spaulding entitled "Cyclic equalization—a new rapidly converging equalization technique for synchronous data communication", published in Bell System Technical Journal, Vol. 54, No. 2, February 1975, pp. 369–406, and also in U.S. Pat. No. 4,089,061 (A. T. Milewski) entitled "Method and apparatus for determining the initial values of a complex transversal equalizer". In the systems described in these prior art references, a periodic training signal is used, which repeats periodically a basic short sequence. The length of the period is selected to correspond to the length of the equalizer delay line.

Of key interest in modem receiver training is the time required for the training operation. In particular, in multidrop polling systems where the control modem receives many short messages from different tributary modems, the receiver has to adapt to the characteristics of a different telephone channel for each message. The time required for training the modem receiver thus has a strong influence on data throughput. Similarly, in half-duplex transmission, the startup time of the receiving modem contributes significantly to the turn-around delay.

Known training procedures and arrangements require the receipt of several periods of the training signal.

OBJECTS OF THE INVENTION

It is a primary object of the invention to enable, in a modem receiver, the rapid detection of a received periodic training signal.

It is a further object of this invention to enable the detection of a training signal in a modem receiver after receipt of one period of that signal already.

Another object of the invention is to devise a training procedure and apparatus for modem receivers which allow the optimum utilization of a training signal whose period is known to the receiver, whose length, however, need not be known to the receiver.

A further object of the invention is a method of training signal detection in modem receivers that allows to obtain rapidly a precise estimate of the carrier frequency offset of the received signal.

DISCLOSURE OF THE INVENTION

These objects are achieved by the invention which provides, in the receiver of a data modem, the storing of a section of a received training signal equal in length to the sum of one training signal period plus a window of given length; evaluating two windows at the beginning and at the end of the stored section and obtaining signals which represent the signal energy of the samples in the windows and the correlation between the two sample sets; generating a dissimilarity metric from these two signals; and comparing this metric with a given threshold to obtain an indication for the presence of a training signal in the receiver.

In a more refined embodiment of the invention, stored samples of the received training signal and corresponding later received samples can be accumulated and averaged, as long as the indicator signal for the presence of a training signal stays active.

When using this invention, receiver parameters can be calculated and used directly after reception of the first period of the training signal, despite the presence of intersymbol interference, noise, carrier frequency offset, and other telephone channel impairments. However, the training result can be improved if a training signal is received for a time lasting longer than one period.

The invention also allows to use one of the signals obtained in the evaluation of the window contents, to generate an estimate of the carrier frequency offset immediately after reception of the first training signal period, and thus to compensate the effect of carrier frequency offset during equalizer training.

Further features and advantages of the invention will become apparent from the following detailed description of a preferred embodiment in connection with the accompanying drawings.

LIST OF DRAWINGS

FIG. 1: Schematic general representation of the invention;

FIG. 2: Block diagram of a modem receiver incorporating the invention;

FIG. 3: Block diagram of the training signal evaluation means of FIG. 1 in connection with the enlarged equalizer delay line;

FIG. 4: Diagram representing the behavior of the metric generated in the training sequence evaluation means in response to the reception of a training signal;

FIG. 5: Block representation of an alternative embodiment of the evaluation and control section of the training signal evaluation means; and FIG. 6: Diagram representing the behavior of the signals generated by the evaluation and control section of FIG. 5 in response to a received training signal.

DETAILED DESCRIPTION

(1) Concept of Invention

It is assumed that for training a modem receiver, the transmitter sends, prior to actual data transmission, a periodic training signal whose period is equal to M symbol intervals T, and that the equalizer of the modem evaluates a signal span having the same length (MT). The received training signal reflects the current transmission conditions and a full period of it is required for enabling computation of the equalizer tap gains, and for performing carrier synchronization.

Figure 1:
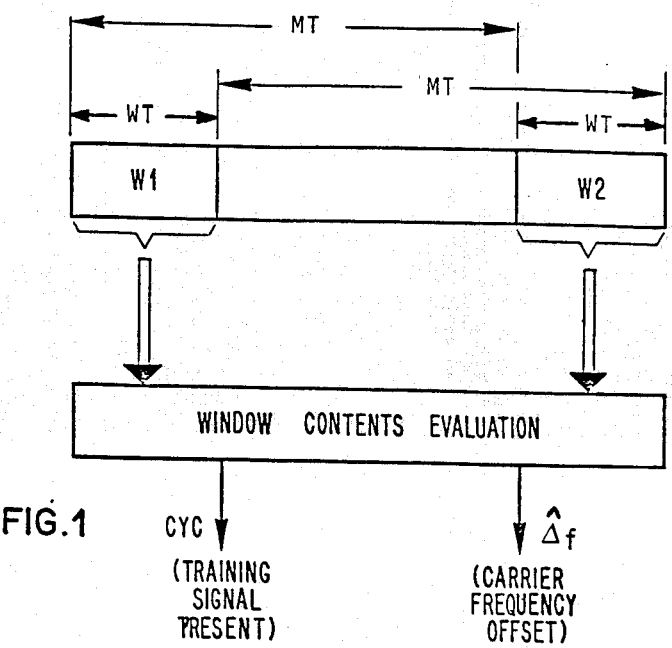

The invention enables to detect the presence of the periodic training signal in the receiver as shown in FIG. 1:

The receiver stores a section of the received signal which is equal to the length of one training sequence period (MT) plus an additional window of length WT which is shorter than the training period.

In the absence of any channel noise, the stored signal section includes only samples of the periodic training signal, and the samples in the two windows W1 and W2, one at the beginning and one at the end of the stored section, should be the same, except for a possible phase rotation due to carrier-frequency offset. This is being recognized by the method of the invention which evaluates the two windows of the stored signal in several steps:

(A) Determination of signal energy of the samples in the two windows.

(B) Correlation of the sample sets in the two windows, which gives also a measure of the carrier frequency offset.

(C) Combined evaluation of the results of A and B to obtain a metric which is a measure for the dissimilarity of the sample sets in the two windows. The value of the dissimilarity metric will be small only when a periodic signal is actually present.

(D) Comparison of the dissimilarity metric to a given threshold value will yield a binary decision signal CYC indicating the presence of a training signal.

(E) From the correlation result of step B which is also a measure of the carrier frequency offset, an estimate $\hat{\Delta}_f$ is determined by an additional step. The estimate of the carrier-frequency offset is then used during computation of the equalizer coefficients, and for initializing the carrier-phase tracking circuitry.

To summarize: The presence of a periodic training signal is detected by evaluating two windows of a stored signal, which are offset against each other by an amount corresponding to the length of the training signal period. Under ideal transmission conditions, the sample sets in the two windows should be equal. However, a possible carrier frequency offset introduces a phase shift between the sample sets of the two windows. The invention obtains, from the contents of the two windows, an estimate of the carrier frequency offset and uses this for compensation so that signal periodicity can be detected despite a carrier frequency offset.

(2) Theoretical Background

It is assumed that in the modem receiver, the received signal is sampled, gain-controlled, and preprocessed by a Hilbert filter which generates q complex output samples per symbol interval. The complex samples are then stored in a delay line of length qM where M equals the period (in symbol intervals T) of the training sequence $\{b_n\}$. Let $$x_{nq-i} = u_{nq-i} e^{j2\pi \Delta_f (nq-i)T/q} + w_{nq-i}, \quad i=0,1 \ldots Mq-1 \quad (1)$$

denote the samples in the delay line at time nT. The $\{u_{nq-i}\}$ represent the sampled training signal after filtering by the channel transfer function, the $\{w_{nq-i}\}$ represent noise of approximate bandwidth 1/T sampled at rate q/T, and $\Delta_f$ is an unknown carrier frequency offset.

Because amplitude and phase distortion introduced by the telephone line do not affect the periodicity of the training signal, the $\{u_{nq-i}\}$ become eventually also with a period of Mq sample intervals. Once a full period of the cyclic training signal has been stored in the delay line so that $\{u_{nq-Mq-i}\} = \{u_{nq-i}\}$, samples leaving the delay line differ from samples entering it mainly in the phase rotation $2\pi\Delta_f MT$ due to carrier frequency offset. In the absence of a training signal, however, the $\{w_{nq-i}\}$ entering and the $\{w_{nq-Mq-i}\}$ leaving the delay line are uncorrelated. The presence of a cyclic training signal can thereofre be recognized by computing and monitoring the mertic $$m_n = \min_{\Phi} \left\{ \frac{1}{W} \sum_{i=0}^{W-1} |x_{nq-iq} - x_{nq-Mq-iq} e^{j\Phi}|^2 \right\} \quad (2)$$

$$= \min_{\Phi} \left\{ \frac{1}{W} \sum_{i=0}^{W-1} |x_{nq-iq}|^2 + \frac{1}{W} \sum_{i=0}^{W-1} |x_{nq-Mq-iq}|^2 - \frac{2}{W} Re \left( \sum_{i=0}^{W-1} x_{nq-iq} x^*_{nq-Mq-iq} e^{-j\Phi} \right) \right\}$$

The value of $\Phi$ which minimizes (2) is given by $$\hat{\Phi}_{min} = arg \sum_{i=0}^{W-1} x_{nq-iq} x^*_{nq-Mq-iq}. \quad (3)$$

where $\hat{\Phi}_{min}$ represents the best estimate of the phase rotation $2\pi\Delta_f MT$ between samples entering and leaving the delay line, and W is a measurement window. The best estimate of the carrier frequency offset is then given by $\hat{\Delta}_f = \hat{\Phi}_{min}/2\pi MT$. The minimization maximizes the last term in (2) so that $$m_n = \frac{1}{W} \sum_{i=0}^{W-1} |x_{nq-iq}|^2 + |x_{nq-Mq-iq}|^2 - \left| \frac{2}{W} \sum_{i=0}^{W-1} x_{nq-iq} x^*_{nq-Mq-iq} \right|. \quad (4)$$

It can be shown that the mean of $m_n$ is much larger in the absence than in the presence of a training signal provided gain control maintains constant average signal power in the delay line. Therefore, $m_n$ is normalized with respect to the signal energy in the window, and then compared with a threshold $\Theta$. When $m_n < \Theta$, the decision is "training signal present", and computation of the equalizer coefficients can be carried out. When $m_n < \Theta$, the decision is "training signal not present". In the latter case, the delay line contains only noise or part of a period of the training signal.

(3) Modem Receiver Overview

FIG. 2 is a block diagram of a modem receiver in which the present invention is implemented. Those portions of the receiver which are not essential to the invention and are known in the art are only shown as summary functional blocks.

Data signals arriving on a transmission line 11 are processed in a section 13 which comprises a low-pass filter, an A-to-D converter, a Hilbert filter, and also the necessary gain control for adapting the received signals to the required signal level in the receiver. The Hilbert filter provides at its output on lines 15 the preprocessed signals in complex form (two streams of real and imaginary data samples, respectively) at a rate q/T, i.e. q complex samples are furnished for each symbol interval T (oversampling). The samples are fed on lines 15 to a basic delay line 17 which is part of the modem equalizer. This delay line has a capacity of q·M samples, M being the number of symbol intervals that are stored and evaluated in the equalizer. (An extension portion 19 which is added to the delay line 17, thus providing an enlarged delay line 21 for implementing the invention will be explained later).

Each of the q·M=N tap-output signals of the basic equalizer delay line 17 is connected to a gain circuit $C_i$ (total set 23 of N gain circuits) whose gain can be set adaptively for achieving the required equalizer function, as is well known in modem technology. The output signals of the gain circuits $C_0 \ldots C_{N-1}$ are summed up in summation circuit 25. The output of summation circuit 25 is a complex signal which is sampled once every symbol interval (1/T) by sampling means 27 to obtain complex values $r_n$. Because of possible carrier frequency and phase shifts during transmission, carrier phase rotation circuitry 29 is provided which furnishes at its output complex values $s_n$. Symbol detection block 31 derives from each value $s_n$ a symbol $a_n$ which is then decoded in decoding block 33. The output symbol $a_n$ is also fed back on lines 35 to carrier phase rotation circuitry 29 to enable its operation.

It is assumed that the data are scrambled for transmission, so that the decoded data must be fed from decoder 33 to a descrambling unit 37 which in turn issues the received data bits on output line 39.

The modem receiver portions mentioned so far are state of the art and need therefore no further explanation. In the following, the portions added to the receiver for embodying the invention are explained.

The equalizer delay line 17 is enlarged by a portion 19 which can hold q·W additional samples constituting a window that is required for the method of the invention. Thus the total delay line 21 has a capacity of q (M+W) samples. A training signal evaluation section 41 is provided for evaluating samples of a training signal stored in the delay line 21 and for generating in particular a signal CYC on control line 43 which indicates, when activated, the presence of a training signal in the delay line. More details of the training signal evaluation section 41 are shown in FIG. 2 and will be explained later in connection with that figure. Evaluation section 41 is connected by q·W lines 45A to the q·W output taps of the delay line extension 19, for receiving a window of samples over these lines; it is further connected to the first q·W output taps of basic equalizer delay line 17 (i.e. to the output taps of its portion 17') by q·W lines 45B to receive another window of stored samples. As can easily be seen, the two sample sets are offset against each other by exactly q·M samples, i.e. by one "equalizer length" which is equal to the length of the training signal period.

A training signal buffering and averaging unit 47 is provided for holding a "good" training signal period once it is received, (and, in an improved version, for averaging the signal samples of consecutively received training signal periods to obtain finally an "optimum" training signal period), which is required for computing the equalizer tap gains which allows the modem receiver to adapt to the current transmission conditions. The buffering section of unit 47 has a capacity of q·M samples and therefore is connected by q·M lines 49 to q·M taps of the delay line 21. As is shown in FIG. 2, lines 49 are not just connected to all taps of basic delay line 17 but to a tap block which is centered with respect to the total delay line 21 (i.e. no connection is made to buffering and averaging unit 47 from the first and last q·W/2 taps of the total delay line). The reason for this is that at the moment when the end of the training signal is recognized, the front window (17') may already contain "bad" samples (not being part of the training sequence) whose transfer to the buffering and averaging unit 47 should be avoided.

The training signal period available in unit 47 is furnished to tap gain computing section 51 which evaluates the samples of the received training signal to determine the equalizer tap gains, and it furnishes respective control signals over lines 53 to tap gain amplifiers 23. Training signal evaluation section 41 also furnishes a frequency offset estimate $\Delta_f$ on line 55 to tap gain computing unit 51 because the distribution of the tap gains must be adapted to this offset. The frequency offset value $\hat{\Delta}_f$ on line 55 is also furnished to carrier phase rotation circuitry 29 to give it an initial value when operation of the modem starts.

In an alternative embodiment of a portion of the training signal evaluation section 41 (which will be explained in detail in connection with FIGS. 5 and 6), this section issues additional control signals AVG (averaging) and EQZ (equalizing) on control lines 57 and 59, respectively. The AVG signal is fed to the buffering and averaging unit 47 to control the averaging operation, and the EQZ signal is furnished to tap gain computing section 51 for enabling its operation.

Figure 3:
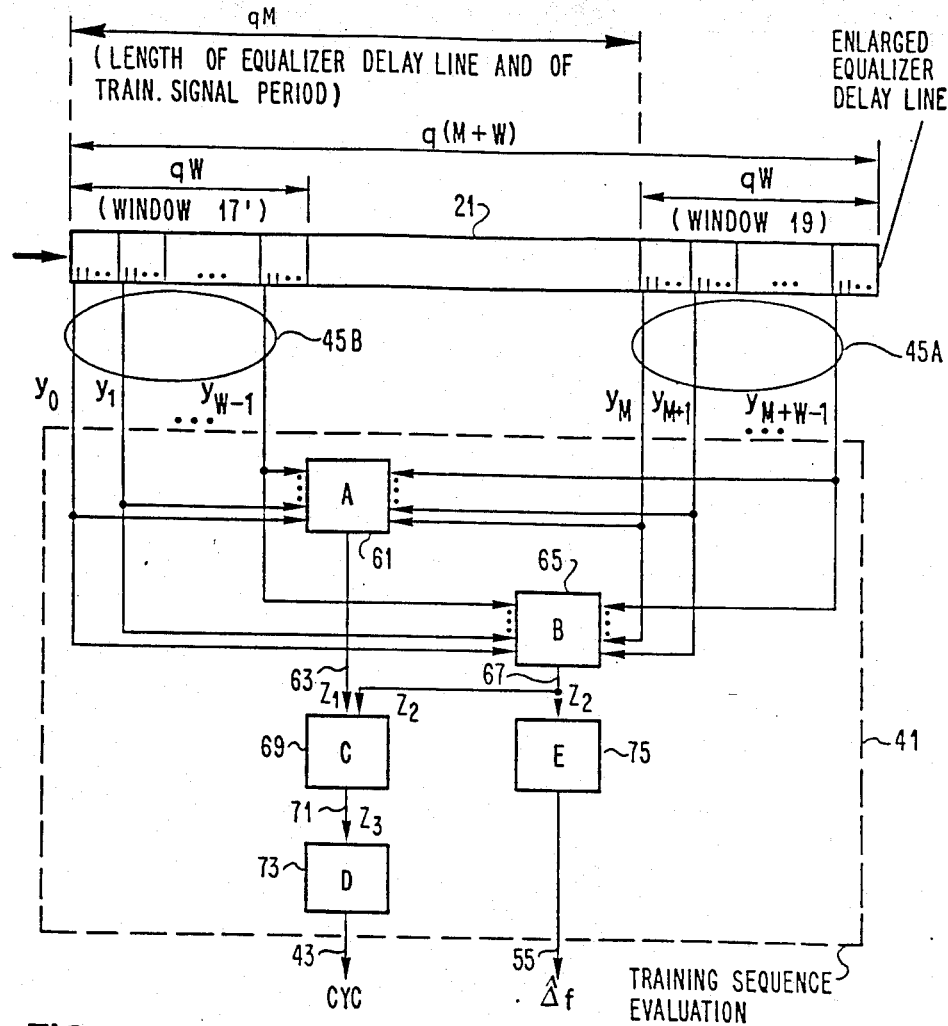

(4) Embodiment of Training Signal Evaluation Section For Detection of Training Signal and For Frequency Offset Estimation Detection of a periodic training signal and estimation of frequency offset is handled by the training signal evaluation section 41 of FIG. 2. Some details of an embodiment of this section are shown in FIG. 3.

The evaluation section 41 is connected by several lines to the enlarged delay line 21, as was explained in connection with FIG. 2. In particular, it is connected by lines 45A to the window section 19 of the delay line holding q·W samples, and by lines 45B to the window section 17' holding the same number of samples. It should be noted that in this embodiment, not all q·W taps of each window section are connected to the evaluation section 41, but only W taps. Thus, only one sample of each symbol interval T is fed to the evaluation section, which is sufficient for operating the invention (though of course all the samples of each window could be used in the evaluation, as shown in FIG. 2; this would, however, cause a larger computation load on evaluation section 41).

It is the task of training signal evaluation section 41 to generate, on line 43, the control signal CYC which indicates when HIGH that a training signal is present in the delay line, and, on line 55, a value $\Delta_f$ representing the carrier frequency offset. For this purpose, it comprises the evaluation means shown as five blocks in FIG. 3, whose function was briefly mentioned already in section 1.

Evaluation means 61 (A) is connected by lines 45A and 45B to both window sections of the delay line, and furnishes on its output 63 a signal $z_1$ which is representative of the signal energy of the samples contained in the windows. Evaluation means 65 (B) is also connected by lines 45A and 45B to the two window sections of delay line 21, and furnishes on its output 67 a signal $z_2$ which is representative of the correlation between the samples in the two windows. Evaluation means 69 (C) receives the output signals $z_1$ and $z_2$ and delivers on its output 71 a dissimilarity metric $z_3$ which is a measure of the distinction between the sample sets in the two windows and thus indicates, when it drops to a low value, that the window contents are similar and thus that a periodic signal is present. Evaluation means 73 (D) receives the metric $z_3$ and compares it to a stored threshold value; it activates the signal CYC on its output when the metric is below the threshold. Evaluation means 75 (E) receives the signal $z_2$ (correlation signal) and derives from it the value $\Delta_f$ which it furnishes on output 55 as a measure of the carrier frequency offset.

More details of the function of these evaluation means are given in the following.

Delay line 21 retains the samples $x_{nq-i}$ (with $i=0,1,\ldots,(M+W)q-1$) required for computing the metric. Samples $y_i = x_{nq-iq}$ and $y_{M+i} = x_{nq-Mq-iq}$ (with $i=0,1,\ldots,W-1$) are fed into the two evaluation means 61 and 65 (A and B) which compute $$z_1 = \sum_{i=0}^{W-1} |y_i|^2 + |y_{M+i}|^2 \quad (5)$$

and $$z_2 = \sum_{i=0}^{W-1} y_i y_{M+i}^* \quad (6)$$

Evaluation means 69 (C) which receives $z_1$ and $z_2$ computes the dissimilarity metric (see also equ.(4))

$$z_3 = 1 - 2|z_2|/z_1 \quad (7)$$

where the normalization with respect to $z_1$ takes into account that the signal energy in the window may differ from the constant average signal power in the entire delay line. Simultaneously, evaluation means 75 (E) estimates the carrier frequency offset yielding (see also equ.(3))

$$\hat{\Delta}_f = (\arg z_2)/2\pi MT. \quad (8)$$

Finally, evaluation means 73 (D) monitors $z_3$, compares it with threshold $\Theta$, and generates a control signal CYC where $$CYC = \text{LOW if } z_3 > \Theta \text{ "training signal not present"}, \quad (9)$$

$$CYC = \text{HIGH if } z_3 \leq \Theta \text{ "training signal present"}.$$

Figure 4:
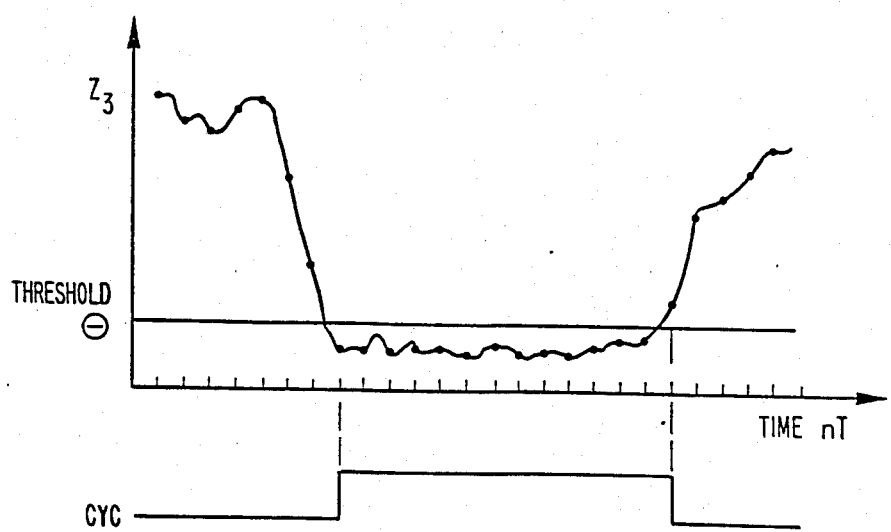

FIG. 4 shows the behavior of $z_3$ and control signal CYC as a function of time in response to an incoming training signal followed by data. In this example, the training signal has a length of 54 symbol intervals with a period of length M = 32. The receiver employs a window of size W = 8, and the delay line has a length of 40 symbol intervals.

Prior to the onset of the training signal, the delay line contains noise samples only. Consequently, $z_3$ is large. As soon as the delay line contains a full period of the training signal, the metric decreases until $z_3$ falls below threshold $\Theta$. The sharpness of this transition depends on line distortion, on the transient characteristics of transmitter and receiver filters, and on the length of the measurement window W. As long as the transmitter continues to send a cyclic training signal, $z_3$ remains low, and the samples in the equalizer delay line can be used to determine the equalizer coefficients. When the periodic training signal ends, the signal becomes aperiodic due to the onset of data. By appending the training sequence with a special end-of-training symbol, $z_3$ can be made to increase very sharply allowing reliable detection of the end of the training signal.

In order to compute the equalizer coefficients, at least one full period of the received training signal is required. The receiver thus copies the samples from the delay line as soon as control signal CYC goes to HIGH, compensates the effect of carrier frequency offset, computes the equalizer coefficients by spectral division, and performs carrier synchronization. The receiver then equalizes the samples in the delay line with the newly computed coefficients and monitors the output of the equalizer for the occurrence of the end-of-training symbol.

One full period of the training signal has been received if $z_3$ falls below threshold for at least one symbol interval. However, reliability of detection in the presence of channel noise is improved by making the training signal long enough so that $z_3$ remains below threshold for several symbol intervals. For example, with M = 32 and W = 8, a minimum length of 48 symbols or 1.5 periods was determined to result in a false-alarm probability of $10^{-4}$ and a miss probability below $10^{-6}$, even in the presence of severe channel distortion, a carrier frequency offset of 20 Hz, and a signal-to-noise ratio of 20 dB.

(5) Improved Control Circuit

Computing the equalizer coefficients using a single period of the training signal allows the shortest possible training time. However, because the samples in the delay line are noisy, equalizer coefficients are obtained which do not compensate amplitude and phase distortion perfectly. The resulting residual inter-symbol interference at the equalizer output can be reduced if the transmitter sends a longer training signal. The receiver then averages the samples copied from the equalizer delay line with samples obtained one or several periods later before computing the equalizer coefficients. Averaging the samples not only improves the coefficient setting in the presence of additive noise, but reduces also the effect of other channel impairments, e.g., phase jitter and amplitude modulation.

Hence, as soon as the presence of a cyclic training signal has been recognized, the receiver copies Mq samples $\{x_{nq-i}\}$ from the equalizer delay line. Averaging is then performed for a fixed time if the length of the training signal is known, or until a sudden increase in the metric indicates that the end of the training signal is imminent. Simultaneously, new samples can be used to improve the estimate of the carrier frequency offset.

Using improved evaluation and control means 73' as shown in FIG. 5 (replacing evaluation means 73 in FIG. 3) allows the receiver to adjust its training operation automatically to whatever length training signal it receives. Evaluation and control means 73' generates three control signals COPY, AVG, and EQZ which control copying, averaging, and equalizer setting. The state of these control signals is determined by $z_3$, by a second variable $z_{min}$ which represents the smallest (best) value of $z_3$ found so far and kept in a $z_{min}$ detector 77, and by the state of a counter 79 which counts the number of symbol intervals where $z_3$ is below threshold. Operation of evaluation and control means 73' is determined by the following rules:

(In these rules, the state of counter 79 is designated as CYC-CNT; C1 and C2 designate lower and higher counter thresholds.)

---

(1) Initially: Set all signals to zero.
(2) If $z_3$ is greater than $\theta$:
    (2a) Set signals AVG=0 and EQZ=0 if CYC−CNT=0;
    (2b) Set signals AVG=1 and EQZ=1 if CYC−CNT not =0.
    (2c) Set CYC−CNT = 0 and COPY = 0
(3) If $z_3$ is less than or equal to $\theta$:
    (3a) Increase CYC−CNT by 1.
    (3b) If EITHER CYC−CNT=1,
        OR if CYC−CNT<C1 AND $z_3<z_{min}$:
        Set signals COPY=1, AVG=0, EQZ=0, and $z_3 = z_{min}$;
    (3c) If CYC−CNT not =1,
        AND if EITHER CYC−CNT$\geq$C1 OR $z_3 \geq z_{min}$:
        (3c1) Set signals COPY=0 and AVG=1;
        (3c2) Set signal EQZ=1 if CYC−CNT>C2;
        (3c3) Set signal EQZ=0 if CYC−CNT$\leq$C2.

---

The above listed tests and operations are done once during each symbol interval T.

A typical behavior of evaluation and control means 73' in response to an incoming training signal is shown in FIG. 6. As soon as the delay line contains a full period of the training signal, the dissimilarity metric $z_3$ decreases until it falls below threshold $\Theta$. Counter 79 starts counting the number of intervals where $z_3$ remains below threshold, and control signal COPY goes to HIGH. As long as $z_3$ decreases, i.e., if $z_3 < z_{min}$, COPY stays HIGH. Once $z_3$ passes through a minimum, COPY goes to LOW, and control signal AVG goes to HIGH. Should an even lower value of $z_3$ be found later by $z_{min}$ detector 77, COPY goes to HIGH again and AVG goes to LOW. However, once the contents of cycle counter 79 has reached C1, control signal COPY stays LOW and AVG stays HIGH.

The receiver thus retains the "best possible" copy of a period of the training signal, and proceeds by averaging new samples with those obtained one period earlier. Averaging is performed until either the contents of cycle counter 79 reaches C2, or $z_3$ goes above threshold as shown in FIG. 6. Finally, control signal EQZ goes to HIGH, and the receiver starts computing the equalizer coefficients. In the following symbol interval, all control signals are reset.

The buffering and averaging unit 47 of FIG. 2 operates as follows in response to control signals COPY and AVG: As long as COPY=1, the training signal section stored in the buffering portion of unit 47 is replaced by the set of qM signal samples present on its input lines 49. If, however, AVG=1, unit 47 determines and stores the average of the training signal samples it has stored already and any new corresponding training signal samples that become available on its input lines 49.

The improved evaluation and control means thus allows the transmitter to send a training signal of arbitrary length, and the receiver to make optimal use of all training signal samples without prior knowledge about the length of the training signal.

We claim:

1. Method of detecting the presence of a periodic training signal in a modem receiver, characterized by the following steps:

storing a sequence of the received training signal comprising q·(M+W) samples, where M is the period of the training signal and W is a predetermined window size, both represented as number of symbol intervals T, and q is a sampling factor representing the number of signal samples taken per symbol interval T;

determining from two windows comprising two sets of q·W samples and being offset against each other by q·M samples, a metric ($z_3$) in response to the energy contained in the two sample sets and in response to the correlation between the two sample sets, said metric representing the dissimilarity between the two sample sets except for a dissimilarity which is solely due to a carrier frequency offset of the received training signal; and comparing said metric ($z_3$) against a predetermined threshold value, for generating a signal (CYC) indicating the presence of a training signal sequence when the metric falls below said threshold value.

2. Method according to claim 1, characterized in that for determining the metric ($z_3$), a first auxiliary value ($z_1$) representing the energy of samples contained in the two windows is generated, and a second auxiliary value ($z_2$) representing the correlation between samples in the two windows is generated; and that the quotient of the second auxiliary value and the first auxiliary value is used for generating the metric ($z_3 = 1 - 2|z_2/z_1|$).

3. Method according to claim 2, characterized in that an estimate for a carrier frequency offset ($\Delta_f$) of the training signal is generated by taking the argument of the second auxiliary value ($z_2$) and dividing it by a given constant ($2\pi MT$).

4. Arrangement for detecting the presence of a received periodic training signal in a modem receiver, characterized in that it comprises:

a tapped delay line (21) for q (M+W) samples where M is the number of symbol intervals T representing the length of the training signal period, W is the number of symbol intervals T representing the length of a receiver window, and q is a sampling factor determining the number of samples taken per symbol interval T;

first evaluation means (61) responsive to the output signals of two sets of delay line taps (45A, 45B), each set comprising W taps and representing one window (19, 17') of q·W samples, which are offset against each other by q·M taps, for generating a signal ($z_1$) representative of the energy of the signal samples contained in the two windows;

second evaluation means (65) responsive to the output signals of the same sets of delay line taps (45A, 45B) as said first evaluation means, for generating a signal ($z_2$) representative of the correlation between the two sets of signal samples contained in the two windows, which signal also constitutes a measure for the carrier frequency offset of the received training signal;

third evaluation means (69) responsive to the output signals ($z_1$, $z_2$) of said first and second evaluation means for generating a metric ($z_3$) representative of the dissimilarity between the two sets of signal samples in the two windows, except for a difference due to a carrier frequency offset; and fourth evaluation means (73) responsive to the metric ($z_3$) generated by said third evaluation means, for comparing said metric to a predetermined threshold value (8) and for generating on its output a signal indicating the presence of a training signal (CYC) when the value of the metric is below said threshold.

5. Arrangement according to claim 4, characterized in that said first evaluation means (61) generates as output signal ($z_1$) the sum of the squares of all sample values received on said two sets of delay line taps (45A, 45B).

6. Arrangement according to claim 4, characterized in that said second evaluation means (65) generates as output signal ($z_2$) the sum of the products of all sample pairs received on corresponding tap pairs ($y_i$, $y_{M+1}^*$) of the two sets of delay line taps (45A, 45B).

7. Arrangement according to claim 5 or 6, characterized in that said third evaluation means (69) determines the value $z_3$ of its output metric from the values $z_1$ and $z_2$ of the signals received from said first (61) and second (65) evaluation means, respectively, by generating $z_3 = 1 - 2|z_2|/z_1$.

8. Arrangement according to claim 4 or 6, characterized in that fifth evaluation means (75) are provided which are connected to the output of said second evaluation means (65), for generating a carrier frequency offset estimation ($\Delta f$) in response to the output signal ($z_2$) of said second evaluation means by determining the argument (arg $z_2$) of said output signal and dividing it by a given constant ($2\pi MT$).

9. Arrangement according to claim 4, in a modem receiver comprising an equalizer delay line (17) for q·M samples, characterized in that said tapped delay line (21) includes said equalizer delay line (17) as a portion of it.

10. Arrangement according to claim 4, characterized in that said fourth evaluation means (73') additionally comprises a minimum detection and storing means (77) for detecting and storing a minimum value ($z_{min}$) of said metric ($z_3$) generated by said third evaluation means (69) and that it has a first output (43) and a second output (57) providing a copy control signal (COPY) and an averaging control signal (AGV), respectively, said copy control signal being active when the current value of the metric ($z_3$) is below the minimum value ($z_{min}$) stored in said minimum detection and storage means (77), and said averaging control signal being active when the current value of the metric ($z_3$) is above the value ($z_{min}$) stored in said minimum detection and storage means (77).

11. Arrangement according to claim 10, characterized in that said fourth evaluation means (73') further comprises counting means (79) for counting the intervals during which the metric ($z_3$) remained below said threshold ($\Theta$), and that when the contents (CYC-CNT) of said counting means (79) has reached a predetermined value (C1), the copying signal (COPY) on said first output (43) is kept inactive and the averaging signal (AGV) on said second output (57) is kept active.

12. Arrangement according to claim 4 or claim 10 or claim 11, characterized in that it comprises a training sequence buffering and averaging means (47), which has storage for q·M samples and which is connected to q·M output taps (49) of said tapped delay line (21) for receiving a full period (M·T samples) of said train signal, and that in responsive to respective control signals (CYC/COPY, 43; AVG, 57) the training signal buffering and averaging means either stores the sample sequence received on its input lines (49), replacing any previously stored samples; or forms and stores the average of the corresponding samples of a sample sequence stored in it and of any new samples available on its input lines (49).

13. Arrangement according to claim 12, characterized in that said q·M output taps (49) to which said training sequence buffering and evaluation means (47) is connected are those taps which are symmetrically located with respect to both ends of the tapped delay line (21).

* * * * *